US008946531B2

(12) United States Patent
Nakata et al.

(10) Patent No.: US 8,946,531 B2
(45) Date of Patent: Feb. 3, 2015

(54) SPRING FORCE ADJUSTMENT STRUCTURE IN HIGH-HAT STAND AND HIGH-HAT STAND INCLUDING THE SPRING FORCE ADJUSTMENT STRUCTURE

(71) Applicant: Sakae Rhythm Musical Instrument Ltd., Osaka (JP)

(72) Inventors: Eizo Nakata, Osaka (JP); Shunsaku Tsuji, Tondabayashi (JP); Manabu Morioka, Nara (JP)

(73) Assignee: Sakae Rhythm Musical Instrument Ltd., Osaka-shi (JP)

( * ) Notice: Subject to any disclaimer, the term of this patent is extended or adjusted under 35 U.S.C. 154(b) by 0 days.

(21) Appl. No.: 14/050,828

(22) Filed: Oct. 10, 2013

(65) Prior Publication Data

US 2014/0096664 A1    Apr. 10, 2014

(30) Foreign Application Priority Data

Oct. 10, 2012    (JP) .................................. 2012-225125

(51) Int. Cl.
*G10D 13/02* (2006.01)
*G10D 13/06* (2006.01)
*F16F 1/12* (2006.01)

(52) U.S. Cl.
CPC .............. *G10D 13/065* (2013.01); *F16F 1/121* (2013.01)
USPC ....................................... 84/422.3

(58) Field of Classification Search
CPC ............................. G10D 13/065; F16F 1/121
See application file for complete search history.

(56) References Cited

U.S. PATENT DOCUMENTS

| 4,488,471 | A | * | 12/1984 | Youakim | 84/422.3 |
| 4,528,888 | A | * | 7/1985 | Hoshino | 84/421 |
| 4,846,040 | A | * | 7/1989 | Hoshino | 84/422.1 |
| 4,977,810 | A | * | 12/1990 | Hsieh | 84/422.3 |
| 5,018,426 | A | * | 5/1991 | Suzuki | 84/422.3 |
| 5,251,528 | A | * | 10/1993 | Kurosaki | 84/422.3 |
| 6,329,584 | B1 | * | 12/2001 | Liao | 84/422.3 |
| 6,930,232 | B2 | * | 8/2005 | Shigenaga | 84/422.3 |
| 7,094,959 | B2 | * | 8/2006 | Marnell | 84/422.3 |
| 8,604,325 | B2 | * | 12/2013 | Sato | 84/422.3 |
| 2006/0169124 | A1 | * | 8/2006 | Tanaka | 84/422.3 |
| 2014/0096664 | A1 | * | 4/2014 | Nakata et al. | 84/422.3 |

FOREIGN PATENT DOCUMENTS

| JP | S61-28237 | 8/1986 |
| JP | H5-21112 | 5/1993 |
| JP | H06-4394 | 2/1994 |

* cited by examiner

*Primary Examiner* — Robert W Horn
(74) *Attorney, Agent, or Firm* — Kratz, Quintos & Hanson, LLP

(57) ABSTRACT

To provide a spring force adjustment structure in a high-hat stand that allows a user to easily adjust a spring force with one hand without reducing a floor space, easily understand the amounts of adjustments made, easily estimate the amount of adjustment to be made when making a fine-tuning afterward, and easily return the spring force to the state before the adjustment.

10 Claims, 11 Drawing Sheets

SPRING FORCE ADJUSTMENT STRUCTURE IN HIGH-HAT STAND AND HIGH-HAT STAND INCLUDING THE SPRING FORCE ADJUSTMENT STRUCTURE

TECHNICAL FIELD

The present invention relates to a spring force adjustment structure in a high-hat stand.

BACKGROUND ART

High-hat stand includes a tubular stand main body in which a lower cymbal is attached to an upper end part thereof, an up/down rod that is inserted into the stand main body and has a protruding upper end part at which an upper cymbal is held, a pedal connected to the lower end of the up/down rod, a coil spring that biases the up/down rod in an upward direction, and a spring force adjustment device that adjusts a spring force of the coil spring, wherein the pedal is stepped on to lower the up/down rod together with the upper cymbal and strike the lower cymbal (for example, refer to Patent Document 1).

The coil spring and the spring force adjustment device are configured such that a bar-like spring receiver is provided inside a tubular body provided in parallel with the lower end part of the stand main body and is connected to the lower end of the up/down rod via a connecting metal fitting, the lower end of the coil spring provided inside the tubular body is locked onto the spring receiver, and the upper end of the coil spring is locked onto an adjustment cap screwed to the upper end part of the tubular body. The adjustment cap is rotated to change the length of the spring to adjust the spring force. These coil spring and spring force adjustment device have a simplified structure and allow an easy adjustment operation. However, when the connecting metal fitting and the tubular body are provided in parallel with the lower end part of the stand main body as described above, it is necessary to make the pedal for operating the stand longer and larger in size to maintain operability. This causes a problem of a further reduction in a limited foot space in the presence of the stand leg and the pedal, thereby leading to deterioration of usability.

Meanwhile, there has been provided a structure in which a coil spring and a spring force adjustment device are provided in the middle of a stand main body. For example, Patent Document 2 suggests a structure including: an internal tube member disposed around an up/down rod on the inner side of the stand main body; a tension coil spring that is provided around the up/down rod on the further inner side of the internal tube member, has an upper end locked onto the upper end of the internal tube member, and has a lower end fixed to the up/down rod; a lock member that is provided at the lower part of the internal tube member so as to protrude to the outside through a notch in the stand main body; and an adjustment member that is rotatably provided on the outer periphery of the stand main body and has at an upper part a plurality of engagement steps different in height and engaging with the lock member.

In such a structure, the stand can be easily operated only by rotating the adjustment member with one hand in the direction in which the lock member descends together with the internal tube member, that is, in the direction in which the spring force becomes weaker. However, the stand needs to be operated by rotating the adjustment member with one hand while raising and holding the lock member with the other hand to engage the steps with the lock member in the direction in which the lock member is raised together with the internal tube member, that is, in the direction in which the spring force becomes stronger. Such an adjustment operation using both hands is troublesome and thus the foregoing structure has a problem of operability. In addition, it is hard for a user to decide the amount of raising the lock member if he or she is not careful. In the case where the user temporarily raises the lock member and then wishes to fine-tune the height of the lock member afterward, he or she cannot understand to what degree to turn the adjustment member to lower the lock member, and as a result, he or she cannot return the lock member even to the state before the adjustment.

Patent Document 3 suggests a structure including: a coil spring locked at one end onto an up/down rod; a slide pin onto which the other end of the coil spring is locked; an elongated hole that is formed in a stand main body and extended along the axial direction of the stand main body, the slide pin being freely inserted into the elongated hole; a sleeve that is fitted and fixed to the stand main body, extended along the axial direction of the stand main body, has an elongated hole into which a protruding part of the slide pin is freely inserted, and has a plurality of engagement grooves arranged along the axial direction of the stand main body and guide paths connected to the engagement grooves; a rotary knob that is rotatably fitted into the stand main body, has a pin engagement part abutted by the protruding part of the slide pin protruding from both of the elongated holes, and has a positioning projection that is engaged with any of the plurality of engagement grooves to set the height of the slide pin with respect to the stand main body.

According to the structure disclosed in Patent Document 3, when the rotary knob is rotated to engage the positioning projection with any of the plurality of engagement grooves, the position of the rotary knob is changed with respect to the axial direction of the sleeve, and the height of the slide pin is also changed with respect to the stand main body, whereby the spring force can be adjusted with one hand. In this structure, however, to adjust the spring force, it is necessary to perform a complicated operation of rotating temporarily the rotary knob to release the positioning projection from the engagement groove in the sleeve and then moving the positioning projection again in the axial direction to fit the positioning projection into another engagement groove. During the operation, the user needs to continuously support the rotary knob against the spring force.

In addition, in the foregoing structure, the positioning projection is not to be moved one by one between the engagement grooves, and thus if the user is not careful, it is hard for him or her to understand how many engagement grooves are passed between before and after movement of the positioning projection in the axial direction. Therefore, in the case where the user adjusts temporarily the spring force and then wishes to fine-tune the spring force again afterward, he or she cannot understand with what engagement groove to engage the positioning projection unless he or she memorize the position of the positioning projection before the adjustment, and thus cannot return the positioning projection even to the state before the adjustment.

CITATION LIST

Patent Literatures

Patent Document 1: JP-UM-B No. S61-28237
Patent Document 2: JP-UM-B No. H05-21112
Patent Document 3: JP-UM-B No. H06-4394

SUMMARY OF INVENTION

Technical Problem

In light of the foregoing circumferences, an object of the present invention is to provide a spring force adjustment structure in a high-hat stand that allows a user to easily adjust a spring force in one hand without reducing a floor space, easily understand the amounts of adjustments made in both directions in which the spring force becomes weaker and stronger, easily estimate the amount of adjustment to be made when making a fine-tuning afterward, and easily return the spring force to the state before the adjustment.

Solution to Problem

To solve the foregoing issue, the present invention constitutes a spring force adjustment structure for a coil spring in a high-hat stand including: a tubular stand main body that is supported by a stand leg and a pedal device and has an upper end part to which a lower cymbal is attached; an up/down rod that is inserted into the stand main body, has a protruding upper end part at which an upper cymbal is held, and has a lower end part to which a pedal is connected; and the coil spring that is attached to the inside of the stand main body to bias upward the up/down rod locked onto one end side thereof, wherein a lock member is provided with a lock part locked onto the other end side of the coil spring and biased downward within the stand main body and an extension part extended to the outside through an elongated groove penetrating a peripheral wall of the stand main body, the lock member being movable vertically along the elongated groove, a cylindrical adjustment member supporting from below the extension part of the lock member is provided so as to be turnable around an axis at a predetermined vertical position on an outer peripheral part of the stand main body, a plurality of engagement steps different in height is circumferentially formed in a stair-like pattern in order of height at a supporting part of the adjustment member supporting the extension part and/or a supported part of the extension part supported by the adjustment member, a return spring is provided to rotate and bias the adjustment member in a direction in which the engagement steps supporting the extension part and/or the engagement steps supported by the adjustment member become gradually higher with respect to the stand main body, when the adjustment member is turned in a direction in which the engagement steps supporting the extension part and/or the engagement steps supported by the adjustment member become gradually lower with respect to the stand main body, the lock member descends along the elongated groove to lower a spring force of the coil spring, and when the lock member is moved upward along the elongated groove, the spring force of the coil spring increases and the adjustment member is biased and rotated by the return spring, and the engagement steps supporting the extension part and/or the engagement steps supported by the adjustment member support the extension part and/or are supported by the adjustment member at higher engagement steps, whereby the lock member is held at the position.

The "height" of the engagement steps here refers to a position along a direction toward an engagement target, that is, an axially upward position for the engagement steps of the supporting part, and an axially downward position for the engagement steps of the supported part. The engagement steps become "higher" with increasing proximity to the engagement target, and become "lower" with decreasing proximity to the engagement target.

It is preferred that a plurality of the supporting parts and/or supported parts of the same stair-like structure is arranged in the circumferential direction.

It is also preferred that the plurality of supporting parts and/or supported parts of the stair-like structure is positioned symmetric with respect to an axial center of the stand main body.

It is also preferred that the adjustment member includes an annular base part that locks the other end side of the return spring locked at one end side onto the outer peripheral part of the stand main body and arranged in the circumferential direction, onto the inner peripheral surface side of the stand main body, and is rotated with an outer peripheral surface thereof as a grip part, and the supporting part provided on an upper surface side of the annular base part.

It is in particular preferred that the adjustment member has a cylindrical part covering the supporting part on the outer peripheral surface side of the supporting part, and the lock member has a cylindrical operation cover extended downward along an outer peripheral surface of the cylindrical part of the adjustment member on the outer side of a portion of the extension part opposed to the supporting part.

The present invention also provides a high-hat stand including the foregoing spring force adjustment structure.

Advantageous Effects of Invention

In the spring force adjustment structure and the high-hat stand including the spring force adjustment structure according to the present invention, the coil spring and the spring force adjustment structure are provided in the stand main body, which eliminates the need to arrange a tubular body in parallel via a connection metal fitting at the lower end part of the stand main body to prevent a reduction in the floor space. Since the plurality of engagement steps different in height is circumferentially formed in a stair-like pattern in order of height at the supporting part of the adjustment member and/or the supported part of the extension part and the return spring rotating and biasing the adjustment member is provided in the direction in which the engagement steps supporting the extension part and/or the engagement steps supported by the adjustment member become gradually higher with respect to the stand main body, when the adjustment member is rotated in the direction in which the engagement steps supporting the extension part and/or the engagement steps supported by the adjustment member gradually become lower, the lock member descends along the elongated groove to adjust the spring force of the coil spring so as to be lower, and at that time, the adjustment member can be easily rotated with one hand. In addition, since the engagement steps are moved one by one in association with the rotation, it is easy for a user to understand the amount of adjustment made. When the lock member is moved upward, the spring force of the coil spring becomes higher and the adjustment member is biased and rotated by the return spring, and thus the engagement steps supporting the extension part and/or the engagement steps supported by the adjustment member support the extension part and/or are supported by the adjustment member at higher engagement steps, which makes it possible to adjust the spring force so as to be higher. At that time, the adjustment member can also be automatically turned through the return spring to the engagement position only by moving the lock member upward with one hand, which allows the adjustment operation to be performed without having to use both hands. In addition, since the engagement steps move one by one together with the upward movement operation, it is easy for a user to understand the amount of the adjustment made. That is, according to the present invention, it is easy to adjust the spring force with one hand in the both directions in which the spring force becomes weaker and stronger and understand the amount of the adjustment made. Therefore, it is also easy to estimate the amount of adjustment to be made when making a fine-tuning afterward and return the spring force to the state before the adjustment.

Since the present invention is structured in such a manner that the plurality of supporting parts and/or supported parts of the same stair-like structure is arranged in the circumferential direction, it is possible to support the lock member in a stable posture by the adjustment member at a plurality of positions, and it is possible to prevent that the lock member enters into an unstable posture and exerts adverse effect on the operation of the up/down rod.

In particular, since the present invention is structured in such a manner that the plurality of supporting parts and/or supported parts of the stair-like structure is positioned symmetric with respect to the axial center of the stand main body, it is possible to support the lock member in a more stable posture.

In addition, since the present invention is structured in such a manner that the adjustment member includes the annular base part that locks the other end side of the return spring locked at the one end side onto the outer peripheral part of the stand main body and arranged in the circumferential direction, onto the inner peripheral surface side of the stand main body, and is rotated with an outer peripheral surface thereof as a grip part, and the supporting part provided on an upper surface side of the annular base part, it is possible to arrange efficiently the return spring on the inside of the annular base part with an increased outer peripheral diameter for enhancement of operability, thereby allowing the adjustment member to be made compact at lower costs.

Further, since the present invention is structured in such a manner that the adjustment member has the tubular part covering the supporting part on the outer peripheral surface side of the supporting part and the lock member has the tubular operation cover extended downward along the outer peripheral surface of the tubular part of the adjustment member on the outer side of the portion of the extension part opposed to the supporting part, the supporting part and the supported part are shielded from the outside by the outer tubular part and the operation cover, respectively. Accordingly, the engagement cannot be seen from the outside, which achieves a preferably simple design of the stand. In addition, it is possible to achieve tight engagement without entry of any foreign object such as dust into the engagement part, assure smooth adjustment operations, and prevent the user from getting his/her fingers pinched at the engagement during execution of the adjustment operations.

DESCRIPTION OF EMBODIMENTS

Next, embodiments of the present invention will be described in detail with reference to the attached drawings.

Figure 1:
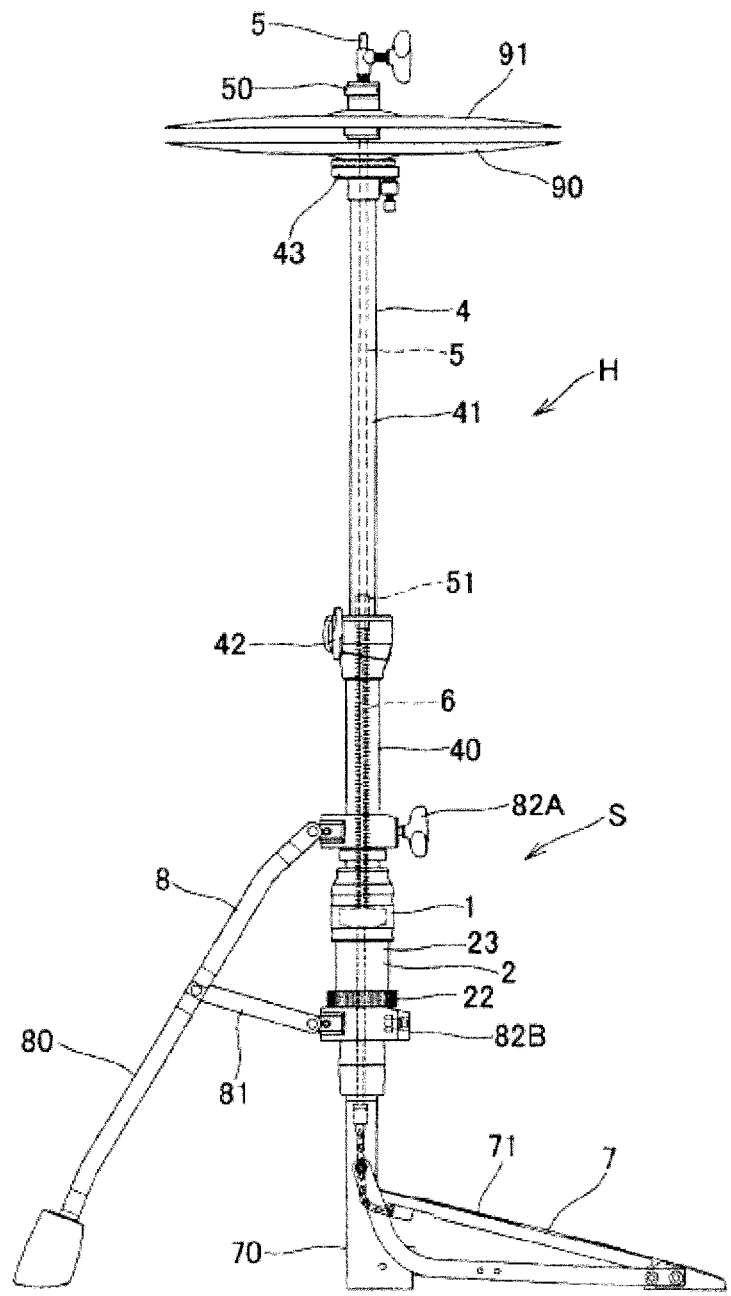
FIG. 1 is an illustrative diagram of an entire configuration of a high-hat stand including a spring force adjustment structure of the present invention.

As shown in FIG. 1, a high-hat stand H including a spring force adjustment structure S as a typical example of the present invention includes: a tubular stand main body 4 that is supported by a stand leg 8 and a pedal device 7, and has an upper end part thereof to which a lower cymbal 90 is attached; an up/down rod 5 that is inserted into the stand main body 4, has a protruding upper end part at which an upper cymbal 91 is held, and has a lower end part to which a pedal 71 is connected; a coil spring 6 that is attached to the inside of the stand main body 4 and biases upward the up/down rod 5 locked onto an one end side 6a thereof to separate the upper cymbal 91 from the lower cymbal 90; and the spring force adjustment structure S adjusting a spring force (elastic restoring force/biasing force) of the coil spring 6.

The stand main body 4 is formed by a lower pipe 40, and an upper pipe 41 that is inserted into an upper part of the lower pipe 40 and is supported by a thumbscrew 42 so as to be capable of being adjusted in height. The lower cymbal 90 is supported by a cymbal receiver 43 provided at the upper end part of the upper pipe 41. The upper cymbal 91 is held by a cymbal holder 50 fixed to the upper end part of the up/down rod 5 protruding from the upper end of the upper pipe 41. When the pedal 71 is stepped on, the up/down rod 5 is lowered against a spring force of the coil spring 6, and the upper cymbal 91 also descends together with the up/down rod 5 to strike the lower cymbal 90 supported by the cymbal receiver 43.

The stand leg 8 is attached to the periphery of the stand main body 4 so as to be capable of being folded in two via support fittings 82A and 82B provided at the lower pipe 40. The stand leg 8 is configured to support the stand main body 4 together with the pedal device 7 connected to the lower end of the stand main body 4. Each portion of the stand leg 8 includes a support leg 80 that has a lower end placed on the floor surface and has an upper end part attached to the lower pipe 40 of the stand main body 4 via the upper support fitting 82A, and a connecting stay 81 that has one end side connected to a middle portion of the support leg 80 and has the other end side attached to the lower pipe 40 via the lower support fitting 82B.

Figure 2:
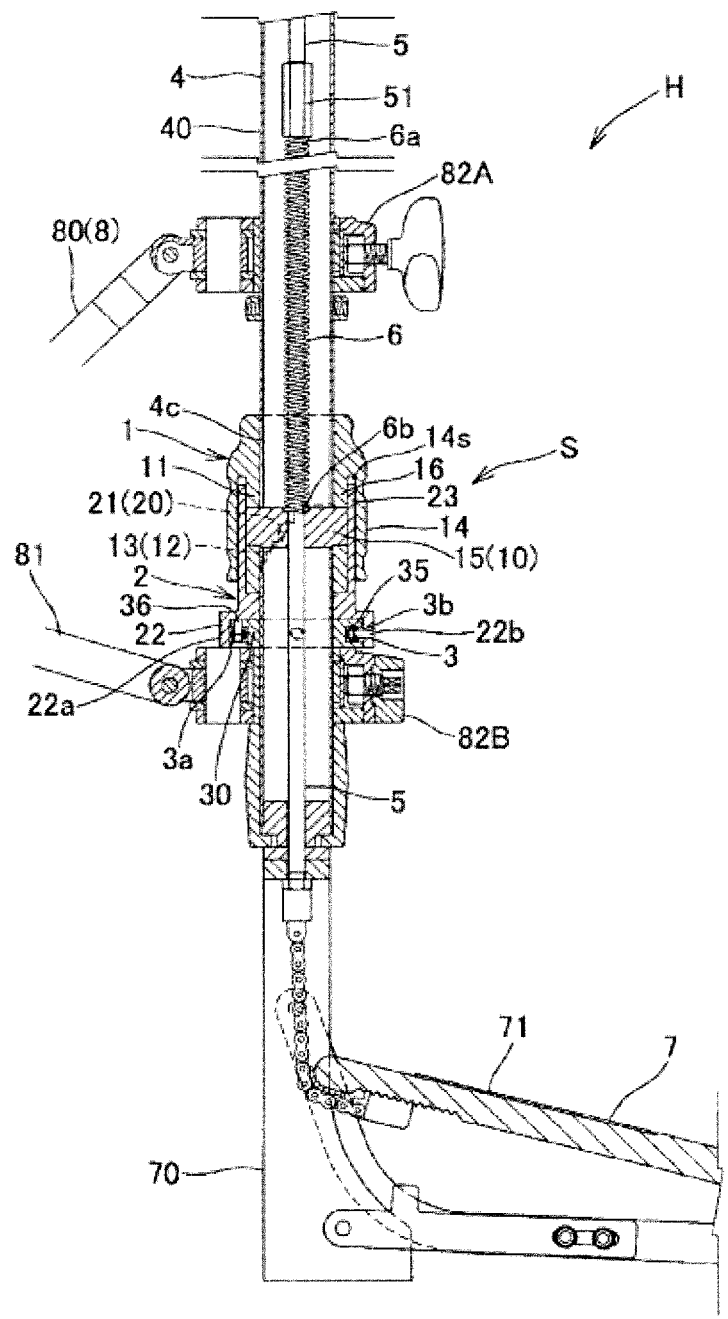
FIG. 2 is a vertical cross-sectional view of main components of the spring force adjustment structure in the high-hat stand.
Figure 3:
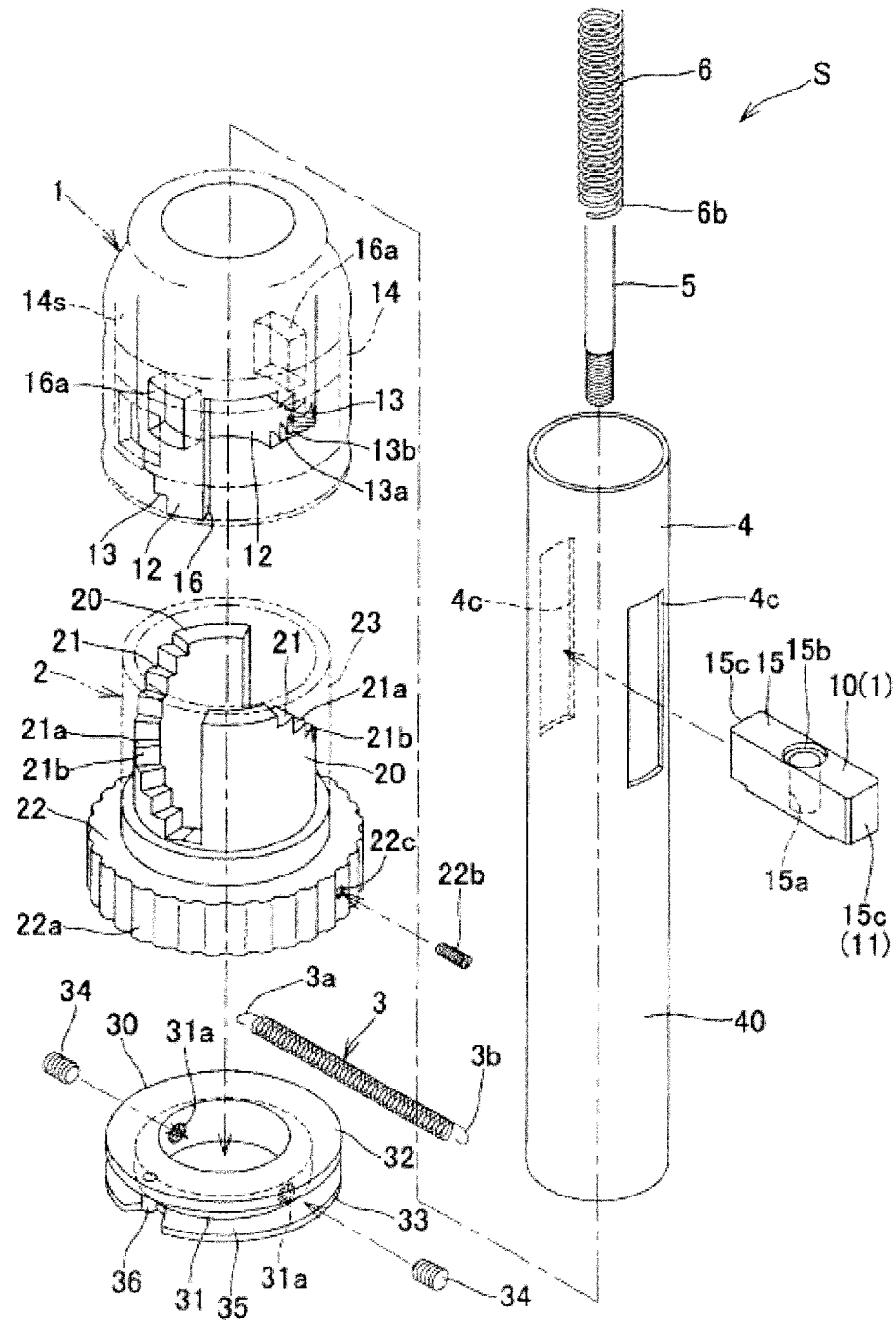
FIG. 3 is an exploded perspective view of main components of the spring force adjustment structure.

The spring force adjustment structure S of the coil spring 6 is formed by a lock member 1, an adjustment member 2, and a return spring 3 as shown in FIGS. 2 and 3. The lock member 1 is configured to lock the other end side 6b of the coil spring 6 locked onto one end side 6a, onto the up/down rod 5, and move vertically along the axis of the stand main body 4 to displace the coil spring 6, thereby to change a spring force. The adjustment member 2 is configured to adjust the amount of movement of the lock member 1. The coil spring 6 is a compression spring that is attached concentrically to the periphery of the up/down rod 5, and has an upper end as one end side 6a locked onto the lower surface of a connecting nut 51 of the up/down rod 5 and has a lower end as other end side 6b locked onto the upper surface of the lock member 1. Instead of the connecting nut 51, a projection may be provided to the outer peripheral surface of the up/down rod 5 onto which the one end side 6a of the coil spring 6 is locked.

Figure 6:
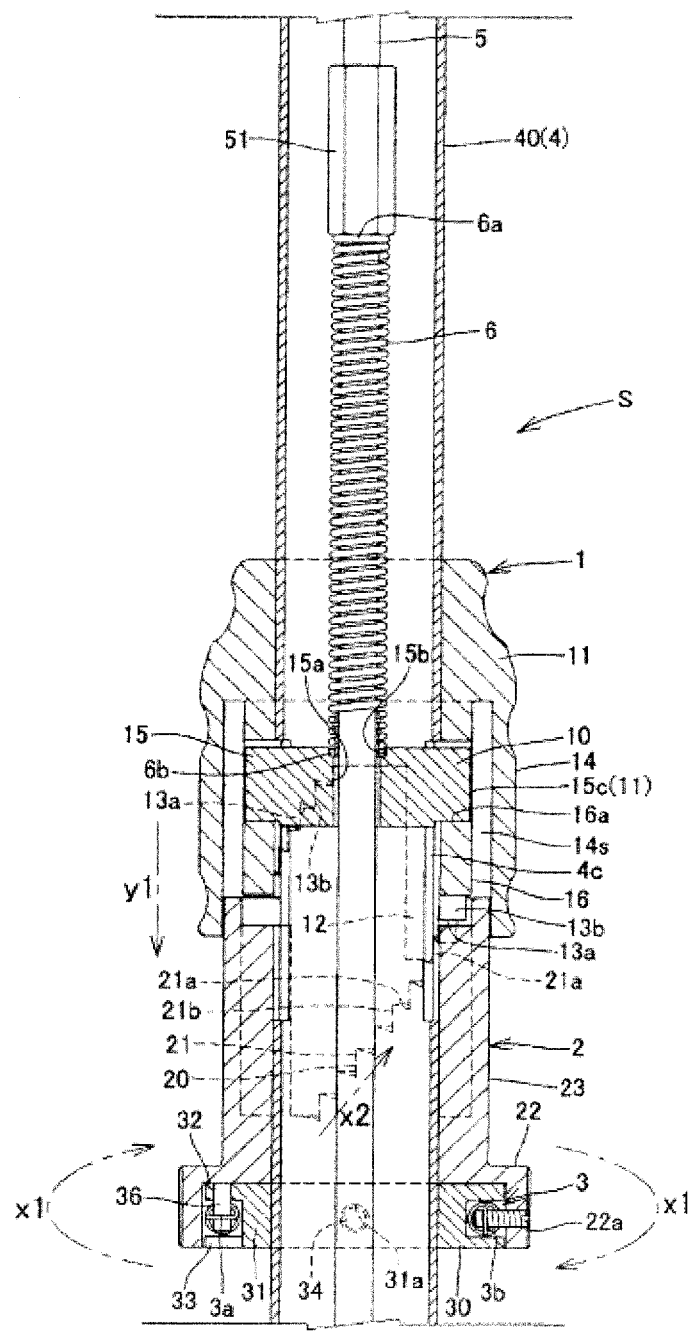
FIG. 6 is a vertical cross-sectional view of the spring force adjustment structure in which the lock member is raised to increase a spring force.

As shown in FIG. 6, the lock member 1 is formed by an engagement part 10 that is biased downward by locking the other end side 6b of the coil spring 6 within the lower pipe 40 and an extension part 11 that is extended to the outside through elongated grooves 4c penetrating the inside and outside of the peripheral wall of the lower pipe 40, and the lock member 1 is vertically movable along the elongated grooves 4c. The extension part 11 on the outside of the lower pipe 40 includes at a portion opposed to stair-like engagement steps 21, . . . of the adjustment member 2 described later, a supported part 12 with engagement steps 13,. . . in an almost the same stair-like pattern engaging with the engagement steps 21, . . . .

Figure 4:
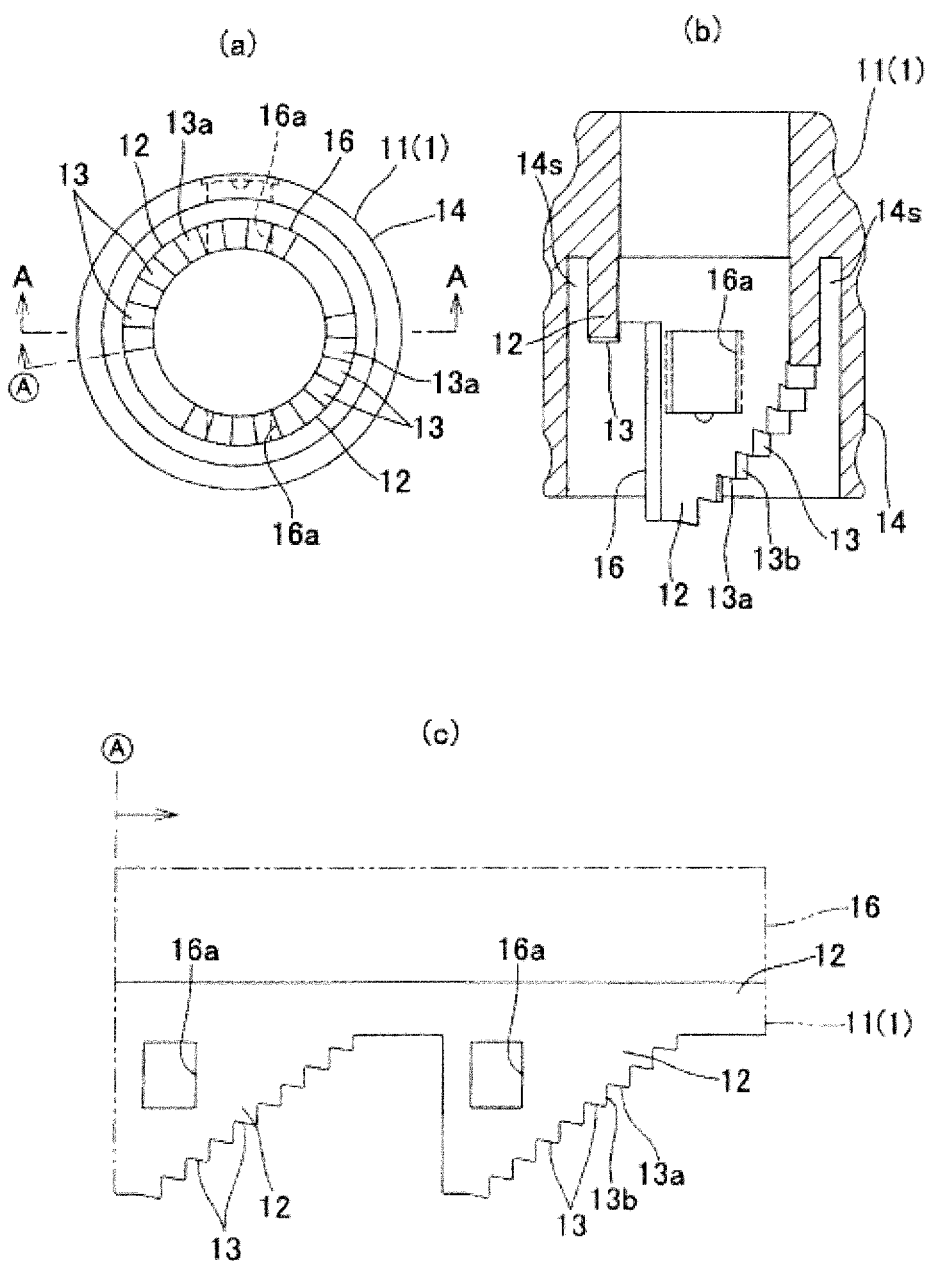
FIG. 4 (a) is a plan view of a supported part of a lock member in the spring force adjustment structure as seen from the lower surface side, FIG. 4 (b) is a vertical cross-sectional view of FIG. 4 (a) taken along line A-A, and FIG. 4 (c) is an opened illustrative view of stair-like engagement steps in the supported part.
Figure 5:
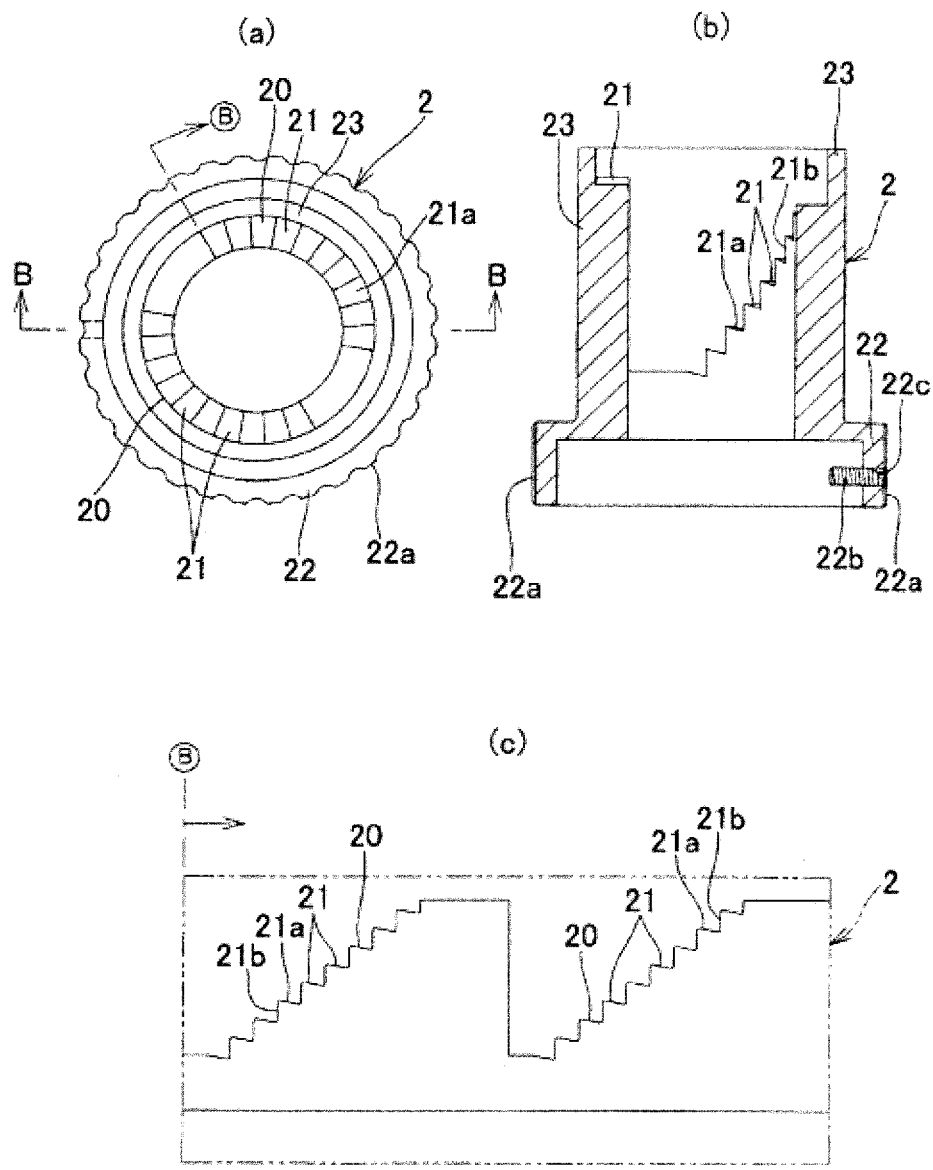
FIG. 5 (a) is a plan view of the adjustment member in the spring force adjustment structure as seen from the upper surface side, FIG. 5 (b) is a vertical cross-sectional view of FIG. 5 (a) taken along line B-B, and FIG. 5 (c) is an opened illustrative view of stair-like engagement steps in a supporting part.

More specifically, as shown in FIGS. 3, 4, and 6, the lock member 1 includes: a bar-like support metal fitting 15 that has at a central part thereof a penetration hole 15a into which the up/down rod 5 is vertically inserted, and a diameter-increased step 15b onto which the other end side 6b of the coil spring 6 is locked at an upper opening edge of the penetration hole 15a, and passes through the elongated grooves 4c and 4c at two axis-symmetrical places on the lower pipe 40 in the lateral direction orthogonal to the axis, and is vertically guided so as to be slidable in the elongated grooves 4c and 4c; a support cylinder 16 that has on a peripheral wall thereof engagement holes 16a and 16a receiving and supporting both end parts 15c and 15c of the support metal fitting 15 extended from the lower pipe 40, and has a supported part 12 with the engagement steps 13 in a stair-like pattern at a lower surface side thereof, and is attached to the outer peripheral surface of the lower pipe 40 so as to be capable of vertically sliding; and a tubular operation cover 14 that is formed integrally on the outside of the support cylinder 16 in a coaxial manner with a gap 14s from the support cylinder 16.

The engagement part 10 is formed by the internal part of the lower pipe 40 including the penetration hole 15a and the step 15b of the support metal fitting 15. The extension part 11 is formed by the both end parts 15c and 15c of the support metal fitting 15 extended to the outside of the lower pipe, and the support cylinder 16 and the operation cover 14 disposed outside of the lower pipe 40 so as to support the both end parts 15c and 15c. The engagement part 10 under direct influence of the biasing force of the coil spring 6 is formed by the metallic support metal fitting 15, and the support cylinder 16 and the operation cover 14 are integrally molded by synthetic resin. However, these components are not limited to the foregoing ones but may be formed by materials selected as appropriate according to required strength and rigidity.

In the representative example, the engagement part 10 is formed by the bar-like support metal fitting 15 but the engagement part 10 is not limited to the bar-like component. For example, the engagement part 10 may be formed by an approximately disc-shaped member that has protrusions at two places of the outer peripheral end thereof extended to the outside of the lower pipe through the elongated grooves 4c and 4c. In addition, the number of extensions of the engagement part 10 from the stand main body (lower pipe 40) is not limited to two but the lower pipe 40 may be provided with three or more elongated grooves such that the engagement part 10 has three or more extensions. In this case, the extensions are preferably provided symmetric with respect to the central axis because the biasing force of the coil spring 6 can be received in a stable posture. Alternatively, only one extension may be provided.

The adjustment member 2 is a cylindrical member that is turnable around the axis at a predetermined vertical position on the outer peripheral part of the lower pipe 40. The adjustment member 2 has a supporting part 20 in which the plurality of engagement steps 21, . . . different in height is circumferentially formed in a stair-like pattern in order of height, and supports by the engagement steps 21 the extension part 11 of the lock member 1, specifically, the supported part 12 on the lower surface of the support cylinder 16.

More specifically, as shown in FIGS. 3 and 5 to 7, the adjustment member 2 includes an annular base part 22 that has an inner peripheral surface side to which the other end side 3b of the return spring 3 is connected and is rotated and operated with an outer peripheral surface as a grip part 22a, the supporting part 20 provided on an upper surface side of the annular base part 22, and a cylindrical part 23 provided on the outer peripheral surface side of the supporting part 20 to cover the supporting part 20. The entire adjustment member 2 including the supporting part 20, the annular base part 22, and the cylindrical part 23 is integrally molded, but the adjustment member 2 may be formed by assembling together separately molded components. For example, the annular base part 22 and the cylindrical part 23 may be integrally molded, and the separately molded supporting part 20 may be assembled into the annular base part 22 and the cylindrical part 23. The cylindrical part 23 is inserted into the gap 14s between the support cylinder 16 of the lock member 1 and the operation cover 14.

The adjustment member 2 is attached so as to be capable of turning around the axis of the lower pipe 40 and incapable of movement in the axial direction, through an attachment member 30 that is fixed to a predetermined axial position on the outer peripheral surface of the lower pipe 40 and is connected to the one end side 3a of the return spring 3. The attachment member 30 has an annular upper flange 32 and a lower flange 33 extending in the outer peripheral direction at upper and lower ends of a cylindrical main body 31 attached on the peripheral surface of the lower pipe 40. The attachment member 30 is fixed by tightening stop screws 34 from the outside into spiral holes 31a radially penetrating through the peripheral wall of the cylindrical main body 31 to press and attach the attachment member 30 to the outer peripheral surface of the lower pipe 40. The annular base part 22 in an L shape in a cross-sectional view is attached to the attachment member 30 so as to be turnable with respect to the attachment member 30.

Figure 7:
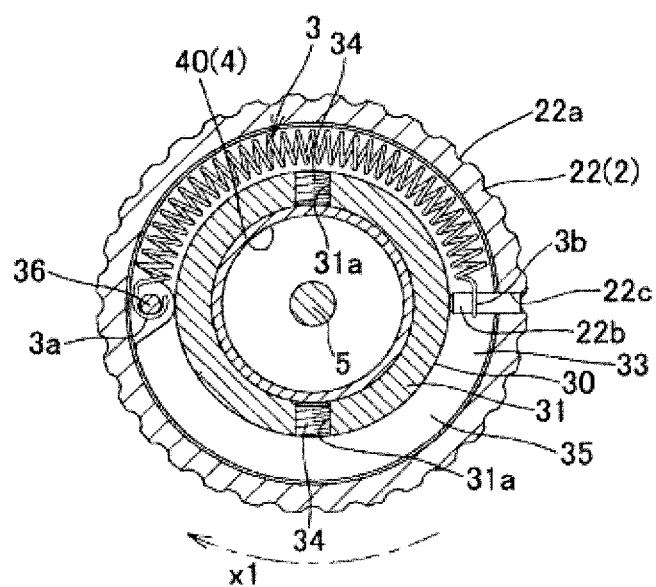
FIG. 7 is a transverse cross-sectional view of the spring force adjustment structure in which the lock member is raised to increase a spring force.

Stored in a concave groove 35 circumferentially extending between the two flanges 32 and 33 of the attachment member 30 is the return spring 3 along the circumferential direction with the one end side 3a locked onto an internally protruding lock convex part 36 as shown in FIGS. 6 and 7. The lock convex part 36 is a lock bar protruding from the upper flange 32 in the axial direction. As a matter of course, alternatively, the lock convex part 36 may be structured in any other form as far as the lock convex part 36 can support the one end side 3a of the return spring 3 in the concave groove 35. In addition, on the inner surface side of the annular base part 22 attached to the attachment member 30, a lock convex part 22b is provided so as to protrude toward the inside of the concave groove 35, and the other end side 3b of the return spring 3 is locked onto the lock convex part 22b. The lock convex part 22b is formed by inserting a stop screw from the outside into a radially penetrating spiral hole 22c on the peripheral wall of the annular base part 22 so as to protrude toward the inside. As a matter of course, alternatively, the lock convex part 22b may be structured in any other form as far as the lock convex part 22b can support the other end side 3b of the return spring 3 in the concave groove 35.

Accordingly, the adjustment member 2 is rotated and biased by the return spring 3 with respect to the attachment member 30, in a direction in which the engagement steps 21 supporting the extension part 11, that is, with regard to one engagement step 13, the engagement step 21 supporting the engagement step 13 becomes gradually higher, and in the direction in which, with regard to the configuration of the adjustment member 2, the engagement steps 21 in the supporting part 20 become lower. At the same time, the lock convex part 22b is restricted in vertical movement between the upper and lower flanges 32 and 33 forming the concave groove 35 and thus the adjustment member 2 is incapable of movement in the axial direction. Although the return spring 3 is a tension coil spring in the representative example, the return spring 3 may be a compression coil spring.

While the engagement steps 21 and 13 engage with each other, when the adjustment member 2 is rotated against the spring force of the return spring 3 in the direction in which the engagement step 21 supporting one engagement step 13 becomes gradually the lower engagement step 21 (along arrows x1 and x2 shown in FIGS. 6 and 7), the lock member 1 descends in the direction of coming closer to the adjustment member 2 (along arrow y1 in FIG. 6) to adjust the spring force of the coil spring 6 so as to be weaker. In the rotation direction, it is possible to rotate relatively the engagement steps 13 so as to slip down step by step to the lower engagement steps 21 in the supporting part 20. In reverse, it is not possible to rotate the engagement steps 13 in the direction in which the engagement step 21 supporting one engagement step 13 becomes the gradually higher engagement step 21, that is, the direction in which the stair-like engagement steps 21 and 13 engage with each other.

When the rotation of the adjustment member 2 is stopped, the pressing and attaching force of the coil spring 6 in the axial direction becomes weaker than that before the adjustment, but in reverse, the circumferential biasing force of the return spring 3 exerting on the adjustment member 2 becomes higher in the direction of engagement (in which the engagement step 21 supporting one engagement step 13 becomes gradually the higher engagement step 21). Accordingly, the engagement steps 13 and 21 firmly engage with each other, which maintains the state in which the adjustment member 2 supports stably the lock member 1. In addition, the number of the engagement steps 13 and 21 engaging with each other, that is, the total area of the engagement increases as compared to that before the adjustment, thereby resulting in high stability.

Figure 8:
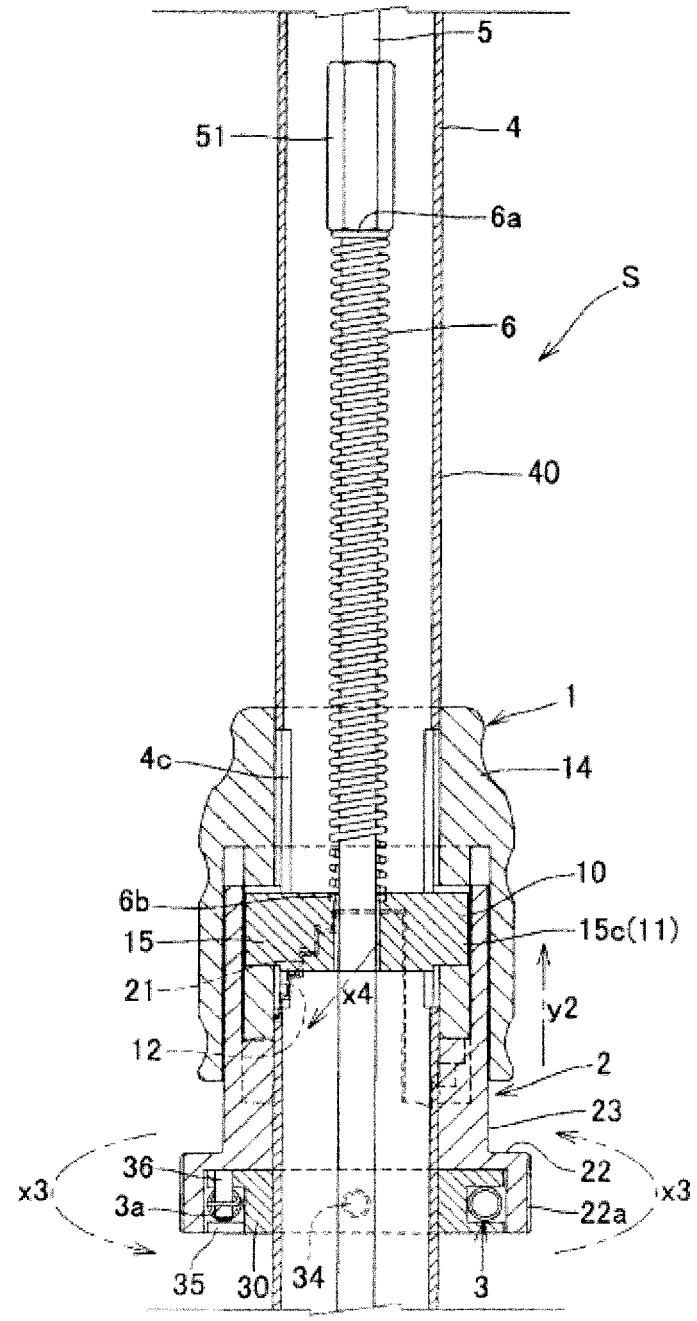
FIG. 8 is a vertical cross-sectional view of the spring force adjustment structure in which the lock member is descended to decrease a spring force.
Figure 9:
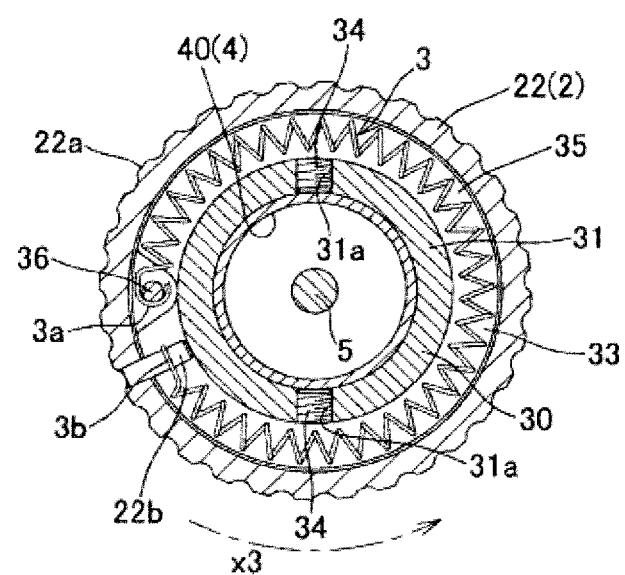
FIG. 9 is a transverse cross-sectional view of the spring force adjustment structure in which the lock member is descended to decrease a spring force.

While the engagement steps 21 and 13 engage with each other, when the lock member 1 is pressed in the upward direction that becomes distant from the adjustment member 2 against the biasing force of the coil spring 6 (along arrow y2 shown in FIG. 8) to escape the engagement steps 13 upward, the adjustment member 2 rotates automatically according to the biasing force of the return spring 3 in the direction in which the engagement step 21 supporting one engagement step 13 becomes gradually one by one the higher engagement step 21 (along arrows x3 and x4 shown in FIGS. 8 and 9), and the engagement steps 13 engage with the higher engagement steps 21 to hold the lock member 1 at the raised position. At that time, the number of the engagement steps 13 and 21 engaging with each other, that is, the total area of the engagement decreases, but the pressing and attaching force of the coil spring 6 in the axial direction increases to maintain the stable state.

While the lock member 1 is pressed and raised to the uppermost position, that is, the position at which the number of the engagement steps 13 and 21 engaging with each other becomes the minimum and thus the adjustment member 2 is rotated according to the biasing force of the return spring 3, the return spring 3 preferably still has a predetermined magnitude or more of biasing force. This makes it possible to stabilize the engagement steps 13 and 21 with the decreased total area of engagement such that the engagement steps 13 and 21 do not disengage from each other.

As in the foregoing, according to the spring force adjustment structure S of the present invention, the spring force of the coil spring 6 can be adjusted so as to be weaker only by rotating the adjustment member 2 as described above, and the spring force of the coil spring 6 can be adjusted so as to be stronger only by moving the lock member 1 in the upward direction. Accordingly, it is possible to adjust the spring force by simple one-handed operations in the both directions in which the spring force becomes weaker and stronger.

In the foregoing representative example, the mutually abutting upper surfaces 21a and lower surfaces 13a of the engagement steps 21 and 13 are formed in inclined surfaces that become gradually higher toward the stepped surfaces 21b and 13b connecting to the lower adjacent engagement steps 21 and 13 in a stair-like pattern to stabilize the engagement state, as illustrated in FIGS. 4 (c) and 5 (c). Alternatively, it is also preferred to realize a stable engagement state by forming smooth concave curved surfaces on one side and forming smooth convex curved surfaces on the other side engaging the concave curved surfaces.

In the representative example, the lock member 1 has the total two supported parts 12 with the stair-like engagement steps 13, . . . at axially-symmetrical positions and the total two supporting parts 20 with the stair-like engagement steps 21, . . . at axially-symmetrical positions, and thus the lock member 1 includes two pairs of the supporting part 20 and the supported part 12 with the engagement steps 13 and 21 engaging with each other. However, the present invention is not limited to this arrangement but may have one or three or more pairs of the supporting part 20 and the supported part 12. When three or more pairs are provided, it is preferred to arrange three each or more supported parts 12 and supporting parts 20 at the lock member 1 and the adjustment member 2 at axially-symmetrical positions.

Figure 10:
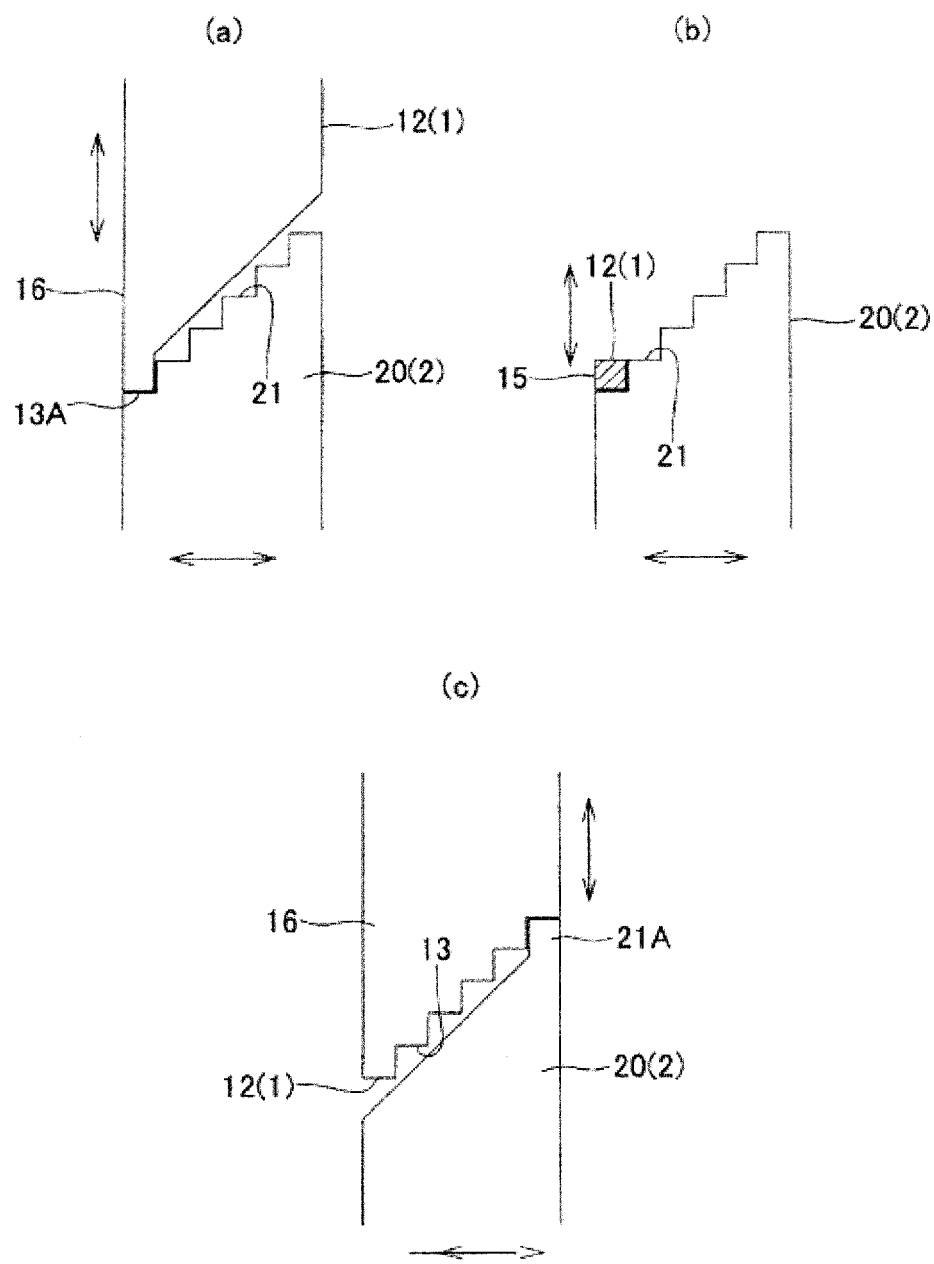
FIGS. 10 (a) to 10 (c) are conceptual diagrams of modification examples of the supported part in the lock member and the supporting part in the adjustment member.

In the representative example, both the supported parts 12 of the lock member 1 and the supporting parts 20 of the adjustment member 2 include almost the same stair-like engagement steps 13 and 21. As a matter of course, alternatively, the present invention may be structured in such a manner that either of the supported parts 12 and the supporting parts 20 include a plurality of stair-like engagement steps 13 . . . or engagement steps 21 . . . . For example, FIG. 10 (a)

shows an example in which the supported part 12 with only one engagement convex portion 13A engaging the engagement step 21 is provided on the lower surface side of the support cylinder 16 in correspondence with the supporting part 20. FIG. 10 (b) shows an example in which the support cylinder 16 is eliminated and a portion of the support metal fitting 15 extended from the lower pipe 40 is set as a supported part 12 engaging the engagement step 21.

In the structure in which only the supporting part 20 is provided with the stair-like engagement steps 21, as in the case in which the both supported part 12 and the supporting part 20 are provided with the engagement steps 13 and 21, it is possible to rotate the adjustment member 2 in the direction in which the engagement step 21 supporting the engagement convex portion 13A or the extended portion of the support metal fitting 15 becomes gradually lower to descend the lock member 1, thereby to adjust the spring force of the coil spring so as to be weaker, or move the lock member 1 upward to support the engagement convex portion 13A or the extended portion of the support metal fitting 15 by the higher engagement step 21, thereby to adjust the spring force of the coil spring so as to be stronger.

FIG. 10 (c) shows an example in which the supporting part 20 is provided with only one engagement convex portion 21A engaging the engagement step 13. In the structure in which only the supported part 12 is provided with the stair-like engagement steps 13, as in the case where the both supported part 12 and supporting part 20 are provided with the engagement steps 13 and 21, it is possible to descend the lock member 1 to adjust the spring force of the coil spring so as to be weaker by turning the adjustment member 2 in the direction in which the engagement step 13 supported by the engagement convex portion 21A becomes gradually lower, and it is possible to adjust the spring force of the coil spring so as to be stronger by moving the lock member 1 upward such that the engagement convex portion 21A supports the higher engagement step 13.

When the both supported parts 12 and supporting parts 20 are provided with the stair-like engagement steps 13 and 21 as in the representative example, the total area of engagement between the engagement steps 13 and 21 increases as the lock member 1 and the adjustment member 2 come closer to each other to decrease the spring force of the coil spring 6, which preferably maintains the sufficiently stable supporting state.

In the representative example, the supported parts 12 of the lock member 1 are shielded from the outside by the operation cover 14, and the supporting parts 20 of the adjustment member 2 are also shielded from the outside by the outer cylindrical part 23. Therefore, even when the lock member 1 moves vertically during adjustment, the supported parts 12, the supporting parts 20, and the engagement between these parts are shielded from the outside, and the supported parts 12 and the supporting parts 20 firmly engage with each other without entry of foreign objects such as dust into the engagement to assure smooth adjustment operations. It is also possible to prevent the user from getting his/her fingers pinched at the engagement during adjustment operations. In addition, the stair-like engagement cannot be seen from the outside, which achieves a preferably simple design of the stand.

In the representative example, the coil spring 6 is a compression spring that has the upper end (6a) locked onto the up/down rod 5 and the lower end (6b) locked onto the lock member 1 to bias the up/down rod 5 upward with respect to the lock member 1. Alternatively, the coil spring 6 may be a tension spring. For example, in the example shown in FIG. 11 (a), the tension coil spring 6 is concentrically attached to the periphery of the up/down rod 5 below the lock member 1, and the lower end (one end side 6a) of the coil spring is locked onto an attachment member 52 provided in the middle portion of the up/down rod 5, and the upper end (other end side 6b) of the coil spring is locked onto an attachment part 15d provided on the lower surface side of the support metal fitting 15 as the engagement part 10 of the lock member 1. In this example, it is also possible to bias the up/down rod 5 upward with respect to the lock member 1 and adjust easily the spring force with one hand according to the spring force adjustment structure S including the lock member 1, the adjustment member 2, and the return spring 3.

Figure 11:
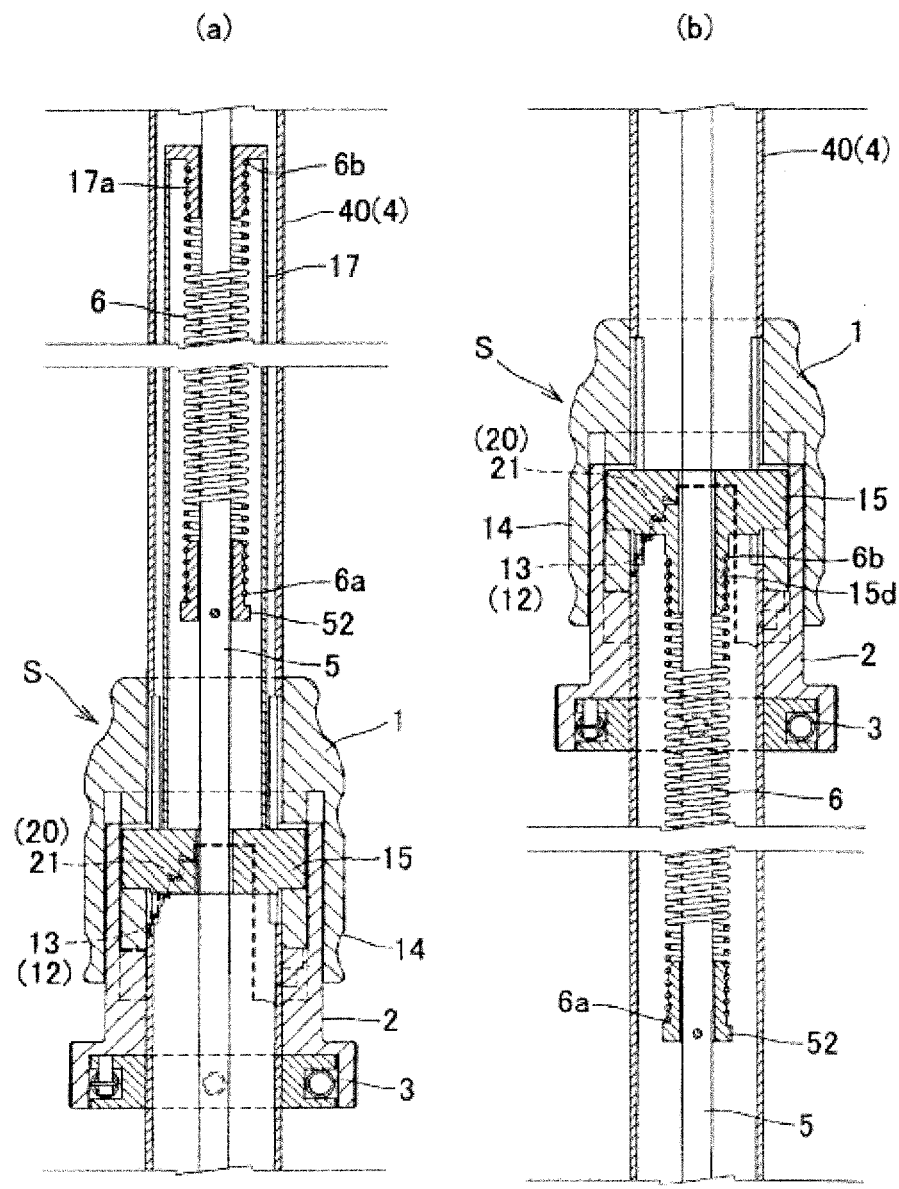
FIGS. 11 (a) and 11 (b) are vertical cross-sectional views of main components in modification examples in which a coil spring is a tension spring.

FIG. 11 (b) shows an example in which the layout of the spring force adjustment structure S including the lock member 1, the adjustment member 2, and the return spring 3, and the coil spring 6, is the same as the layout of the foregoing representative example with the compression coil spring, that is, the tension coil spring 6 is located above the spring force adjustment structure S. Specifically, the tension coil spring 6 is concentrically attached to the periphery of the up/down rod 5 above the lock member 1, a tubular member 17 is extended upward within the lower pipe 40 from the upper surface of the support metal fitting 15 as the engagement part 10 of the lock member 1 so as to cover the coil spring 6, the lower end (one end side 6a) of the coil spring is locked onto the attachment member 52 provided in the middle portion of the up/down rod 5, and the upper end (other end side 6b) of the coil spring 6 is locked onto the attachment part 17a arranged inwardly and downwardly at an upper end part of the tubular member 17. In this example, it is also possible to bias the up/down rod 5 upward with respect to the lock member 1 and adjust easily the spring force with one hand according to the spring force adjustment structure S.

As in the foregoing, embodiments of the present invention are described. However, the present invention is not limited to these embodiments, but as a matter of course, the present invention can be carried out in various modes without deviating from the gist of the present invention. For example, the spring force adjustment structure S in the representative example is provided at the lower pipe 40 constituting the stand main body 4, but the spring force adjustment structure S may be provided at another member (intermediate pipe or the like) constituting the stand main body. In addition, the coil spring 6 is externally attached to the up/down rod 5. Alternatively, the coil spring 6 may not be externally attached to the up/down rod 5 but a single or plurality of coil springs 6 may be provided in parallel to the up/down rod 5 within the tubular main body 4.

REFERENCE SIGNS LIST

1 Lock member
2 Adjustment member
3a One end side
3b Other end side
4 Stand main body
4c Elongated groove
5 Up/down rod
6a One end side
6b Other end side
7 Pedal device
8 Stand leg
10 Engagement part
11 Extension part
12 Supported part
13 Engagement step
13A Engagement convex portion
13a Lower surface 14 Operation cover
14s Gap
15 Support metal fitting
15a Penetration hole
15b Step
15c End part
15d Attachment part
16 Support cylinder
16a Engagement hole
17 Tubular member
17a Attachment part
20 Supporting part
21 Engagement step
21A Engagement convex portion
21a Upper surface
21b Stepped surface
22 Annular base part
22a Grip part
22b Lock convex part
22c Spiral hole
23 Cylindrical part
30 Attachment member
31 Cylindrical main body
31a Spiral hole
32 Upper flange
33 Lower flange
34 Stop screw
35 Concave groove
36 Lock convex part
40 Lower pipe
41 Upper pipe
43 Cymbal receiver
50 Cymbal holder
51 Connecting nut
52 Attachment member
71 Pedal
80 Support leg
81 Connecting stay
82A and 82B Support fitting
90 Lower cymbal
91 Upper cymbal
H High-hat stand
S Spring force adjustment structure

The invention claimed is:

1. A spring force adjustment structure for a coil spring in a high-hat stand comprising: a tubular stand main body that is supported by a stand leg and a pedal device and has an upper end part to which a lower cymbal is attached; an up/down rod that is inserted into the stand main body, has a protruding upper end part at which an upper cymbal is held, and has a lower end part to which a pedal is connected; and the coil spring that is attached to the inside of the stand main body to bias upward the up/down rod locked onto one end side thereof, wherein a lock member is provided with a lock part locked onto the other end side of the coil spring and biased downward within the stand main body and an extension part extended to the outside through an elongated groove penetrating a peripheral wall of the stand main body, the lock member being movable vertically along the elongated groove, a cylindrical adjustment member supporting from below the extension part of the lock member is provided so as to be turnable around an axis at a predetermined vertical position on an outer peripheral part of the stand main body, a plurality of engagement steps different in height is circumferentially formed in a stair-like pattern in order of height at a supporting part of the adjustment member supporting the extension part and/or a supported part of the extension part supported by the adjustment member, a return spring is provided to rotate and bias the adjustment member in a direction in which the engagement steps supporting the extension part and/or the engagement steps supported by the adjustment member become gradually higher with respect to the stand main body, when the adjustment member is turned in a direction in which the engagement steps supporting the extension part and/or the engagement steps supported by the adjustment member become gradually lower with respect to the stand main body, the lock member descends along the elongated groove to lower a spring force of the coil spring, and when the lock member is moved upward along the elongated groove, the spring force of the coil spring increases and the adjustment member is biased and rotated by the return spring, and the engagement steps supporting the extension part and/or the engagement steps supported by the adjustment member support the extension part and/or are supported by the adjustment member at higher engagement steps, whereby the lock member is held at the position.

2. The spring force adjustment structure in a high-hat stand according to claim 1, wherein a plurality of the supporting parts and/or supported parts of the same stair-like structure is arranged in the circumferential direction.

3. The spring force adjustment structure in a high-hat stand according to claim 2, wherein the plurality of supporting parts and/or supported parts of the stair-like structure is positioned symmetric with respect to an axial center of the stand main body.

4. The spring force adjustment structure in a high-hat stand according claim 1, wherein the adjustment member includes an annular base part that locks the other end side of the return spring locked at one end side onto the outer peripheral part of the stand main body and arranged in the circumferential direction, onto the inner peripheral surface side of the stand main body, and is rotated with an outer peripheral surface thereof as a grip part, and the supporting part provided on an upper surface side of the annular base part.

5. The spring force adjustment structure in a high-hat stand according to claim 4, wherein the adjustment member has a cylindrical part covering the supporting part on the outer peripheral surface side of the supporting part, and the lock member has a cylindrical operation cover extended downward along an outer peripheral surface of the cylindrical part of the adjustment member on the outer side of a portion of the extension part opposed to the supporting part.

6. A high-had stand including the spring force adjustment structure according to claim 1.

7. The spring force adjustment structure in a high-hat stand according to claim 2, wherein the adjustment member includes an annular base part that locks the other end side of the return spring locked at one end side onto the outer peripheral part of the stand main body and arranged in the circumferential direction, onto the inner peripheral surface side of the stand main body, and is rotated with an outer peripheral surface thereof as a grip part, and the supporting part provided on an upper surface side of the annular base part.

8. The spring force adjustment structure in a high-hat stand according claim 3, wherein the adjustment member includes an annular base part that locks the other end side of the return spring locked at one end side onto the outer peripheral part of the stand main body and arranged in the circumferential direction, onto the inner peripheral surface side of the stand main body, and is rotated with an outer peripheral surface thereof as a grip part, and the supporting part provided on an upper surface side of the annular base part.

9. The spring force adjustment structure in a high-hat stand according to claim 7, wherein the adjustment member has a cylindrical part covering the supporting part on the outer peripheral surface side of the supporting part, and the lock member has a cylindrical operation cover extended downward along an outer peripheral surface of the cylindrical part of the adjustment member on the outer side of a portion of the extension part opposed to the supporting part.

10. The spring force adjustment structure in a high-hat stand according to claim 8, wherein the adjustment member has a cylindrical part covering the supporting part on the outer peripheral surface side of the supporting part, and the lock member has a cylindrical operation cover extended downward along an outer peripheral surface of the cylindrical part of the adjustment member on the outer side of a portion of the extension part opposed to the supporting part.

\* \* \* \* \*